Figure 1:
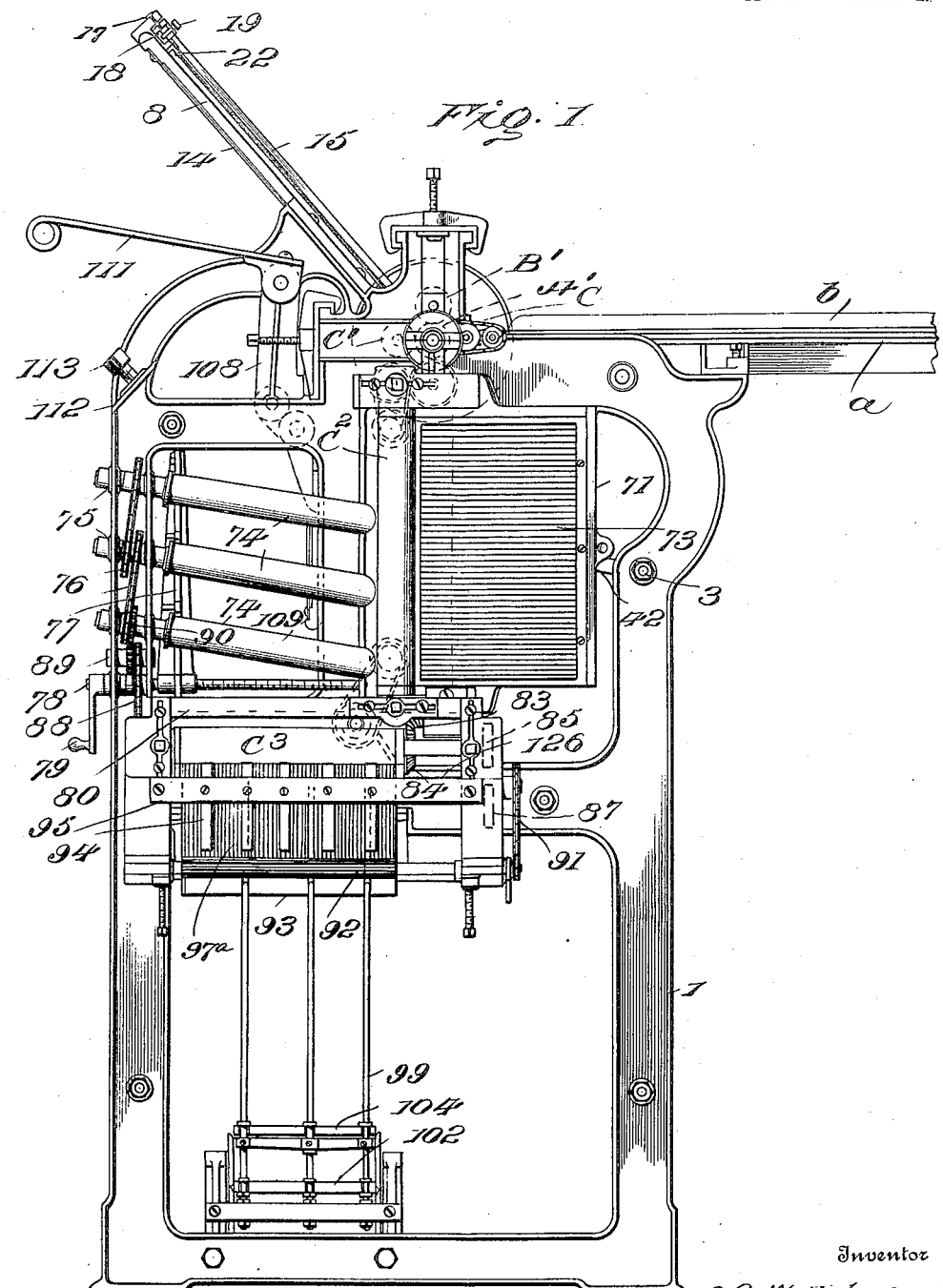

No. 893,629. PATENTED JULY 21, 1908.
O. W. JOHNSON.
PAPER FOLDING MACHINE.
APPLICATION FILED FEB. 7, 1907. RENEWED NOV. 16, 1907.

11 SHEETS—SHEET 1.

Witnesses

Inventor
O. W. Johnson
By R. H. A. B. Lacey,
Attorneys

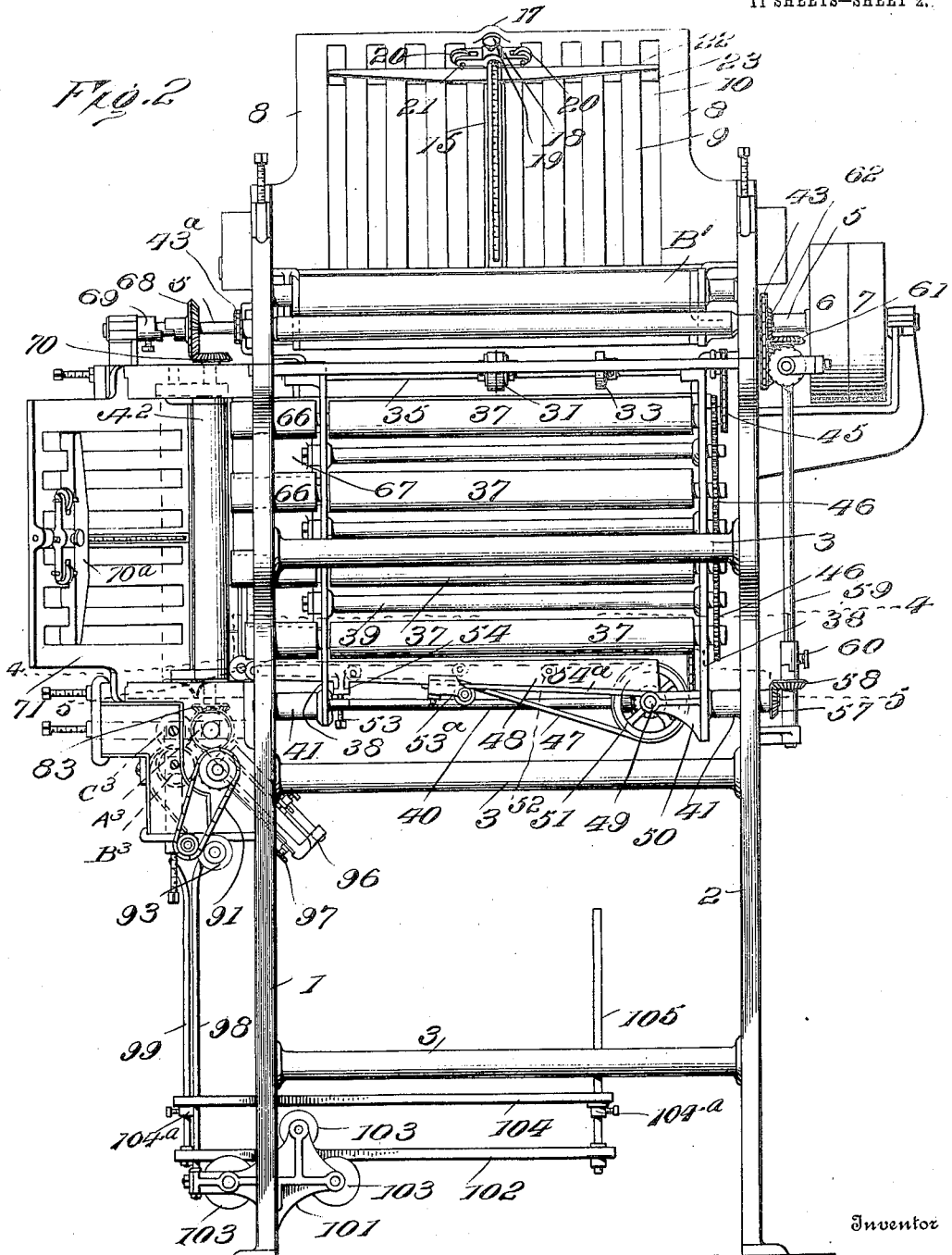

No. 893,629. PATENTED JULY 21, 1908.
O. W. JOHNSON.
PAPER FOLDING MACHINE.
APPLICATION FILED FEB. 7, 1907. RENEWED NOV. 16, 1907.
11 SHEETS—SHEET 3.
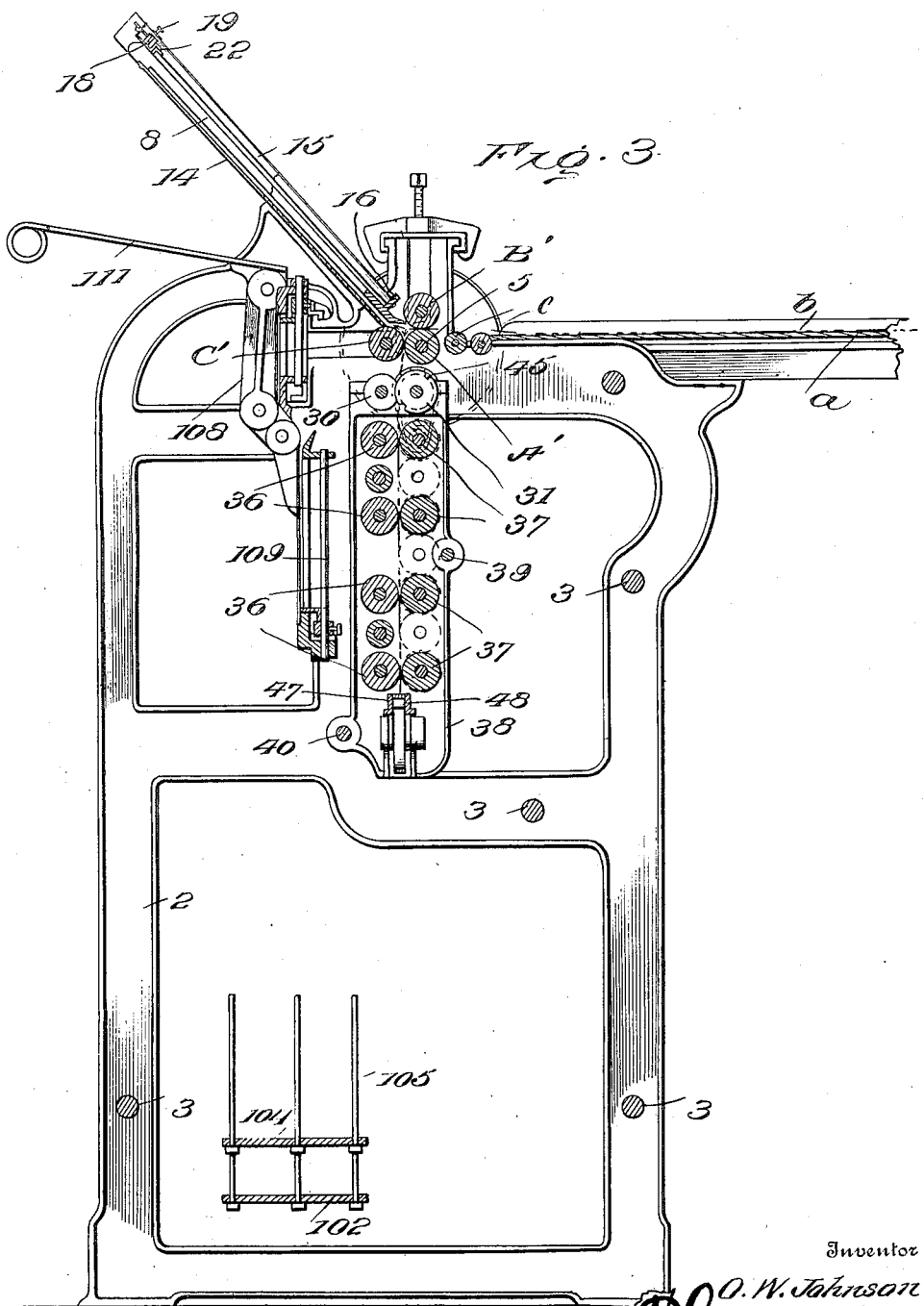
Witnesses
Inventor
O. W. Johnson
By
Attorneys No. 893,629. PATENTED JULY 21, 1908.
O. W. JOHNSON.
PAPER FOLDING MACHINE.
APPLICATION FILED FEB. 7, 1907. RENEWED NOV. 16, 1907.
11 SHEETS—SHEET 4.
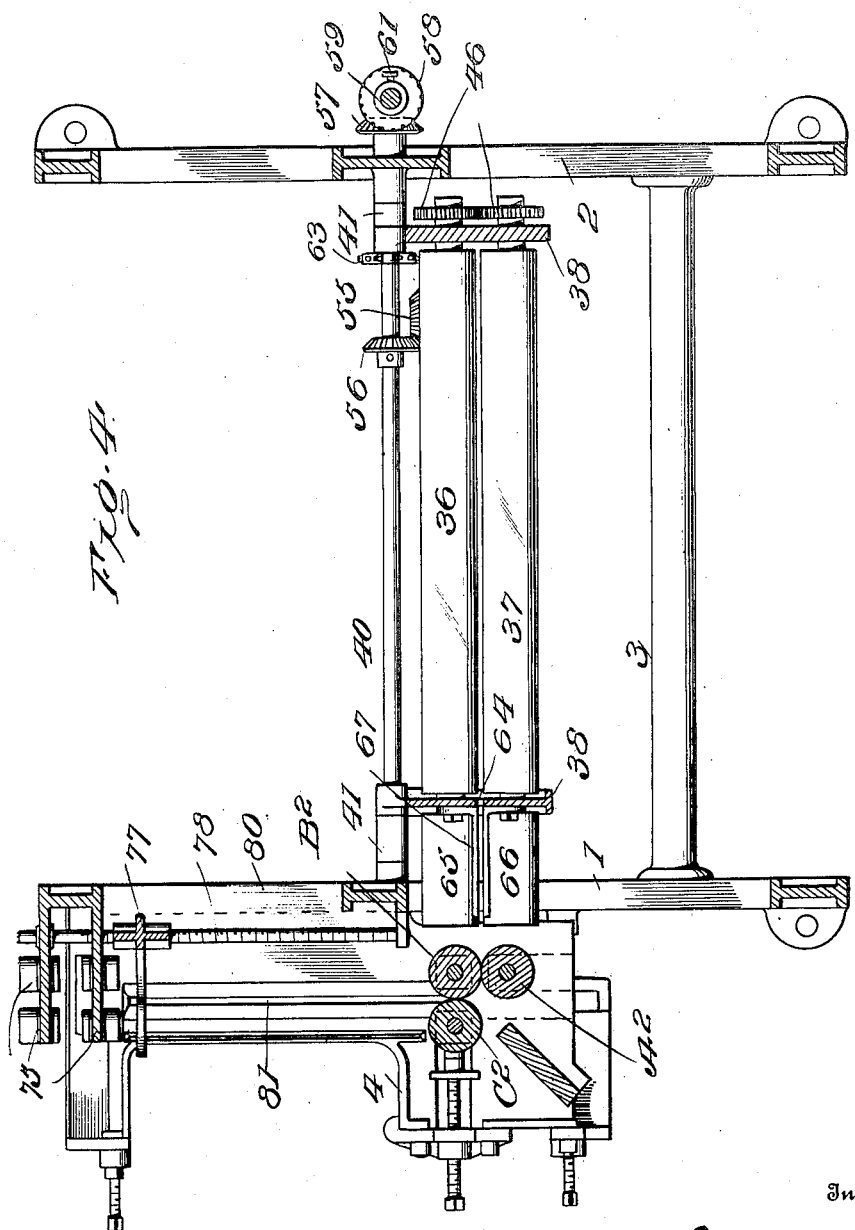

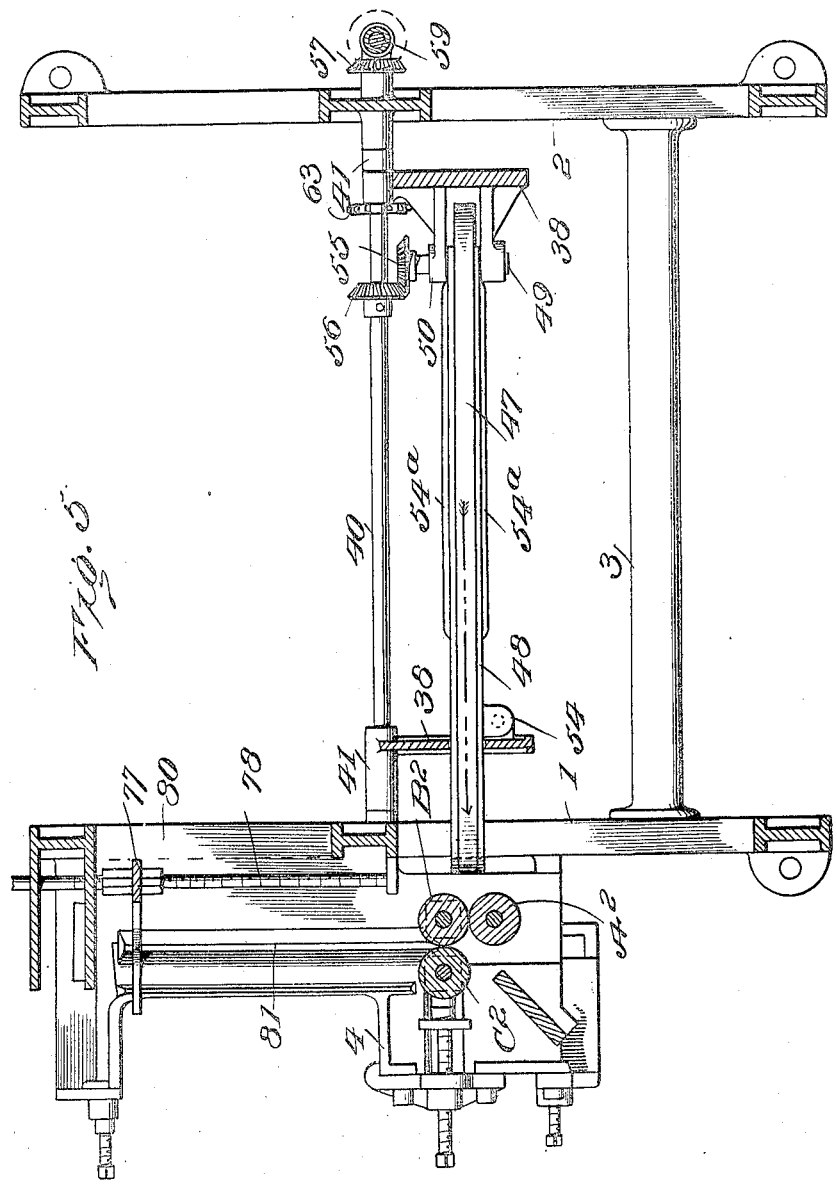

No. 893,629. PATENTED JULY 21, 1908.
O. W. JOHNSON.
PAPER FOLDING MACHINE.
APPLICATION FILED FEB. 7, 1907. RENEWED NOV. 16, 1907.
11 SHEETS—SHEET 6.
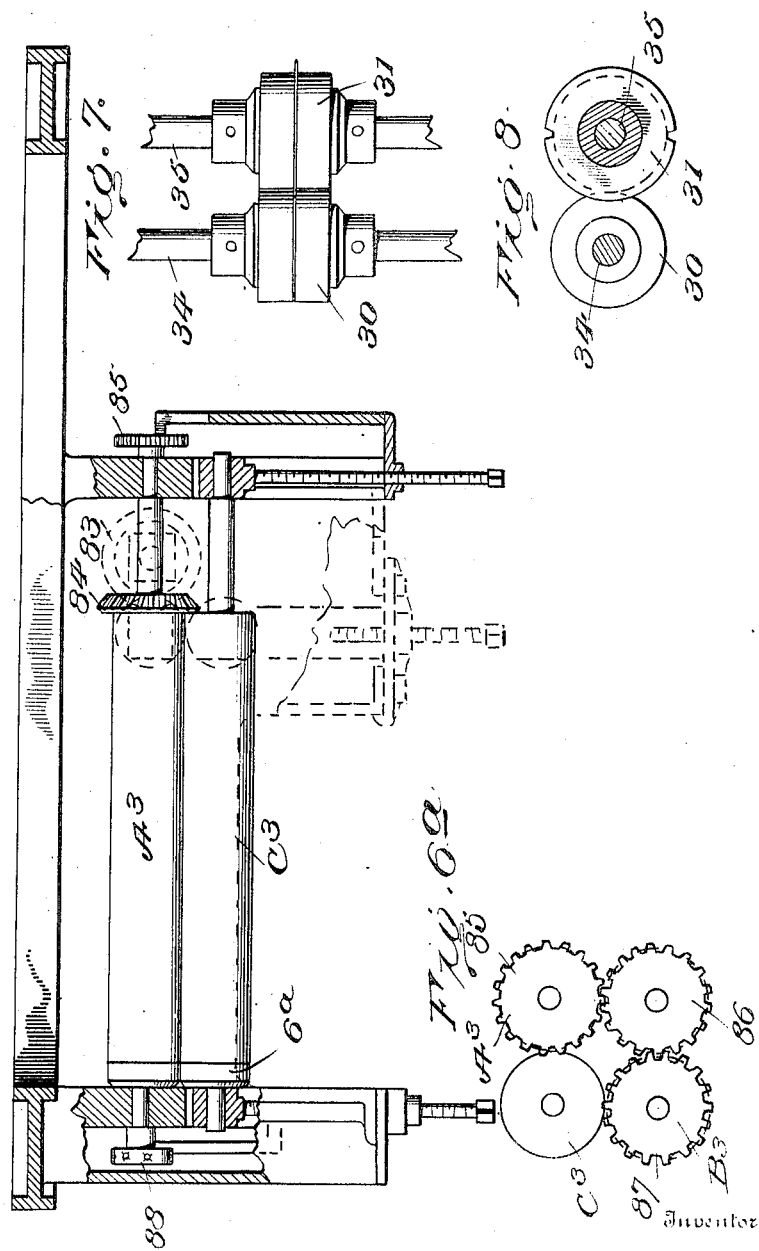

No. 893,629. PATENTED JULY 21, 1908.
O. W. JOHNSON.
PAPER FOLDING MACHINE.
APPLICATION FILED FEB. 7, 1907. RENEWED NOV. 16, 1907.
11 SHEETS—SHEET 7.
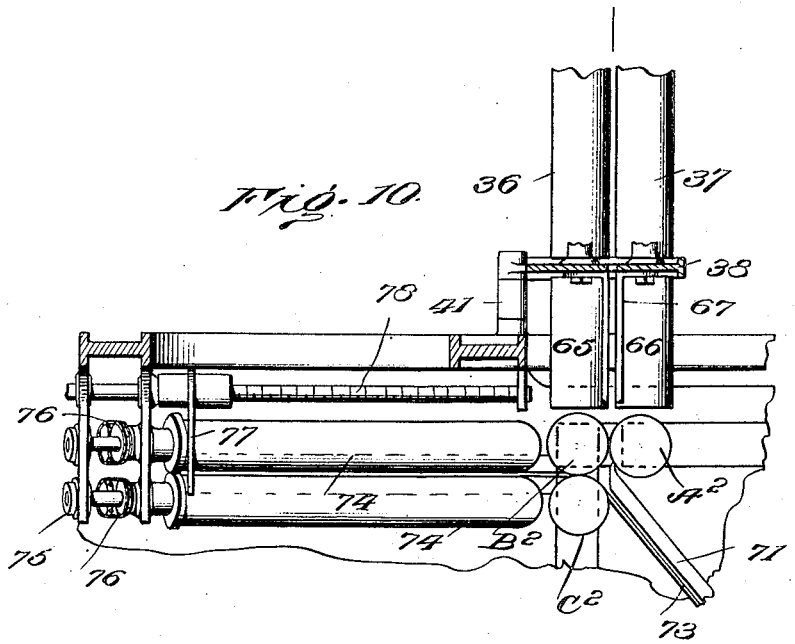
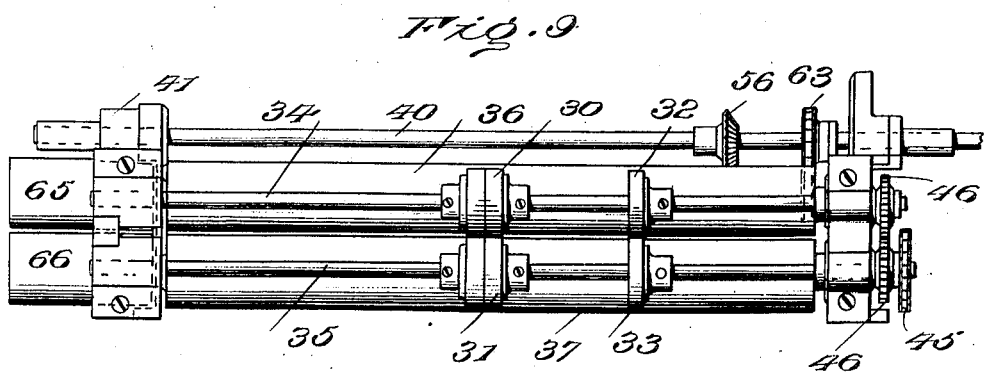
Witnesses
Inventor
O. W. Johnson
By
Attorneys

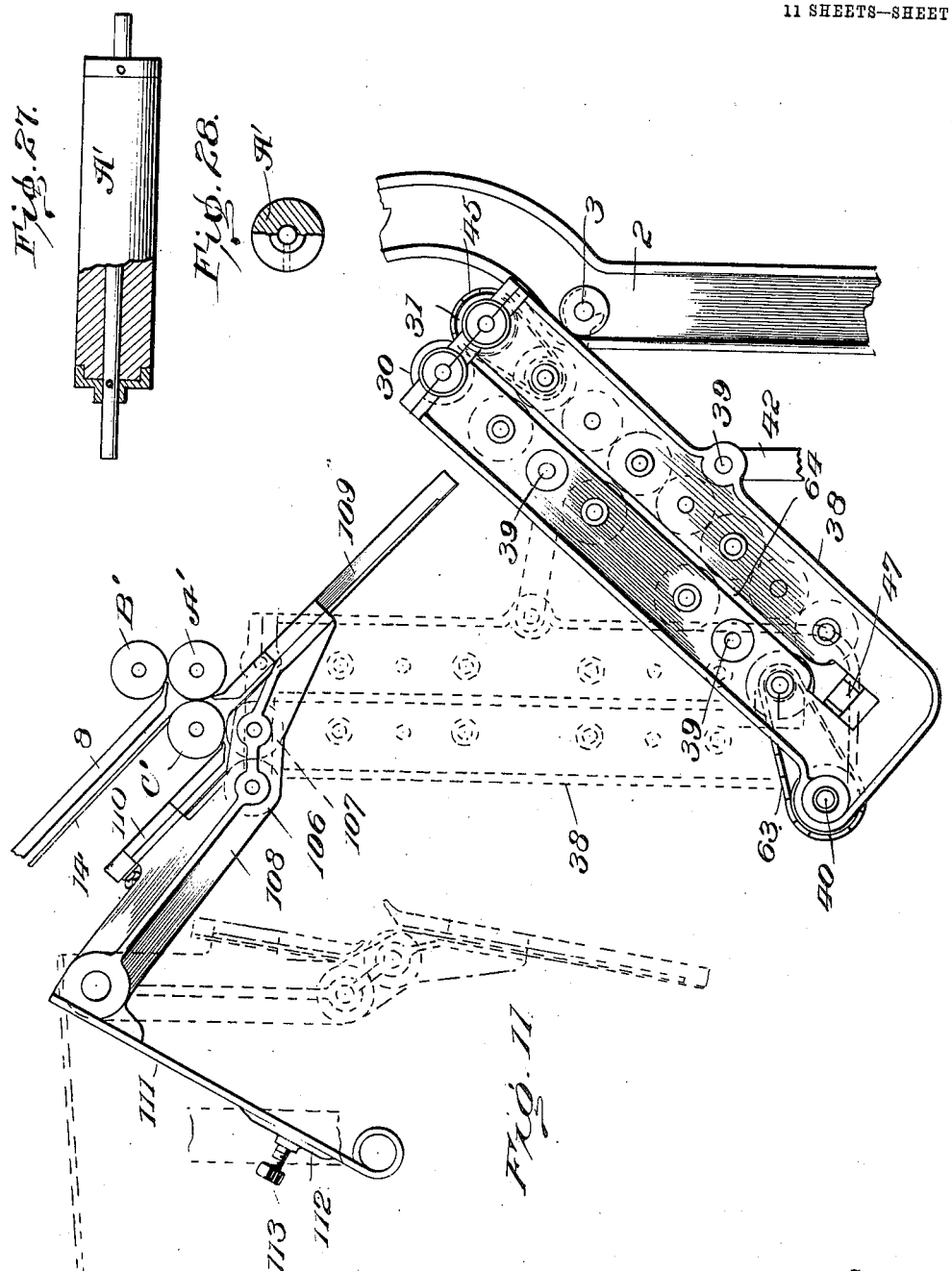

No. 893,629. PATENTED JULY 21, 1908.
O. W. JOHNSON.
PAPER FOLDING MACHINE.
APPLICATION FILED FEB. 7, 1907. RENEWED NOV. 16, 1907.
11 SHEETS—SHEET 9.
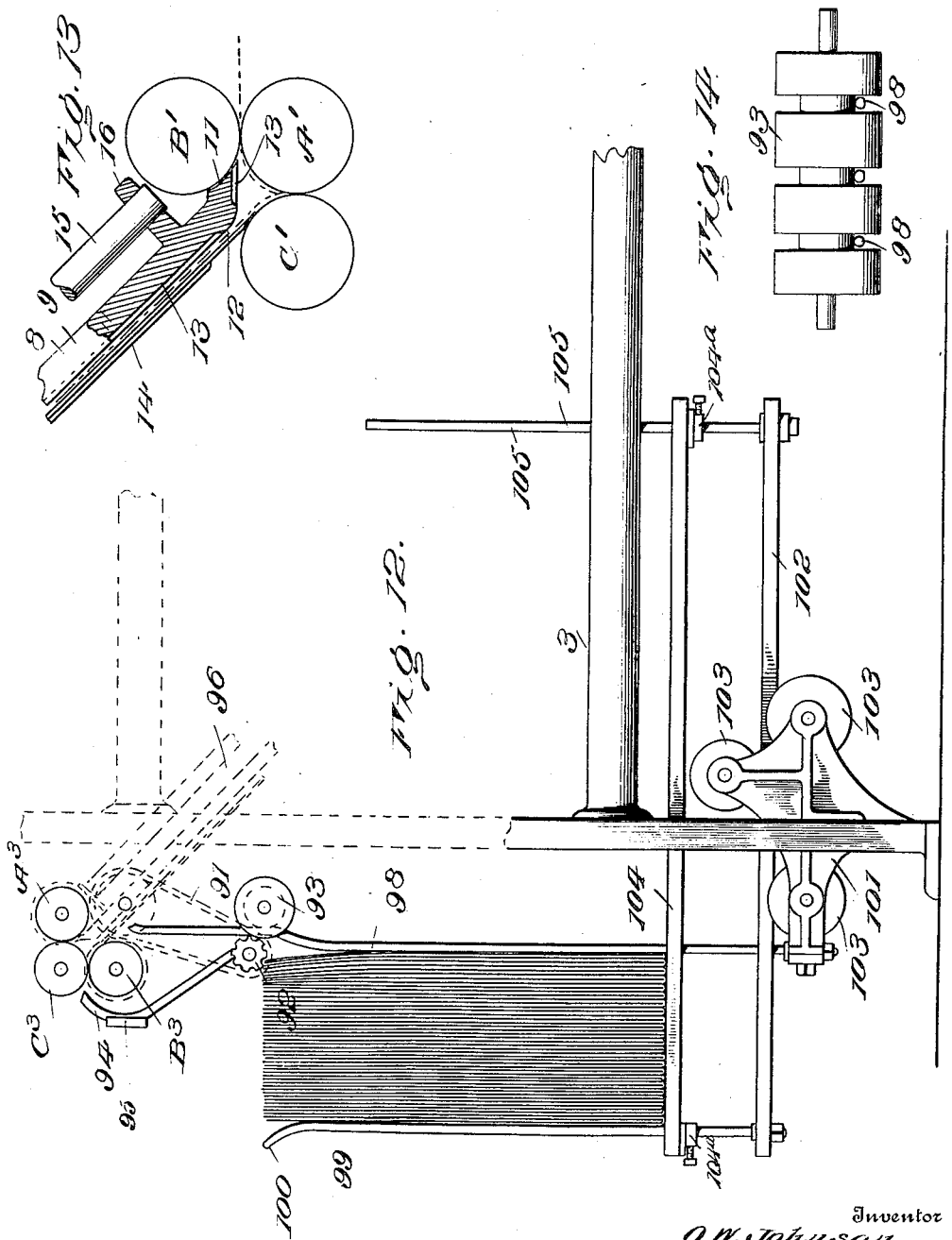

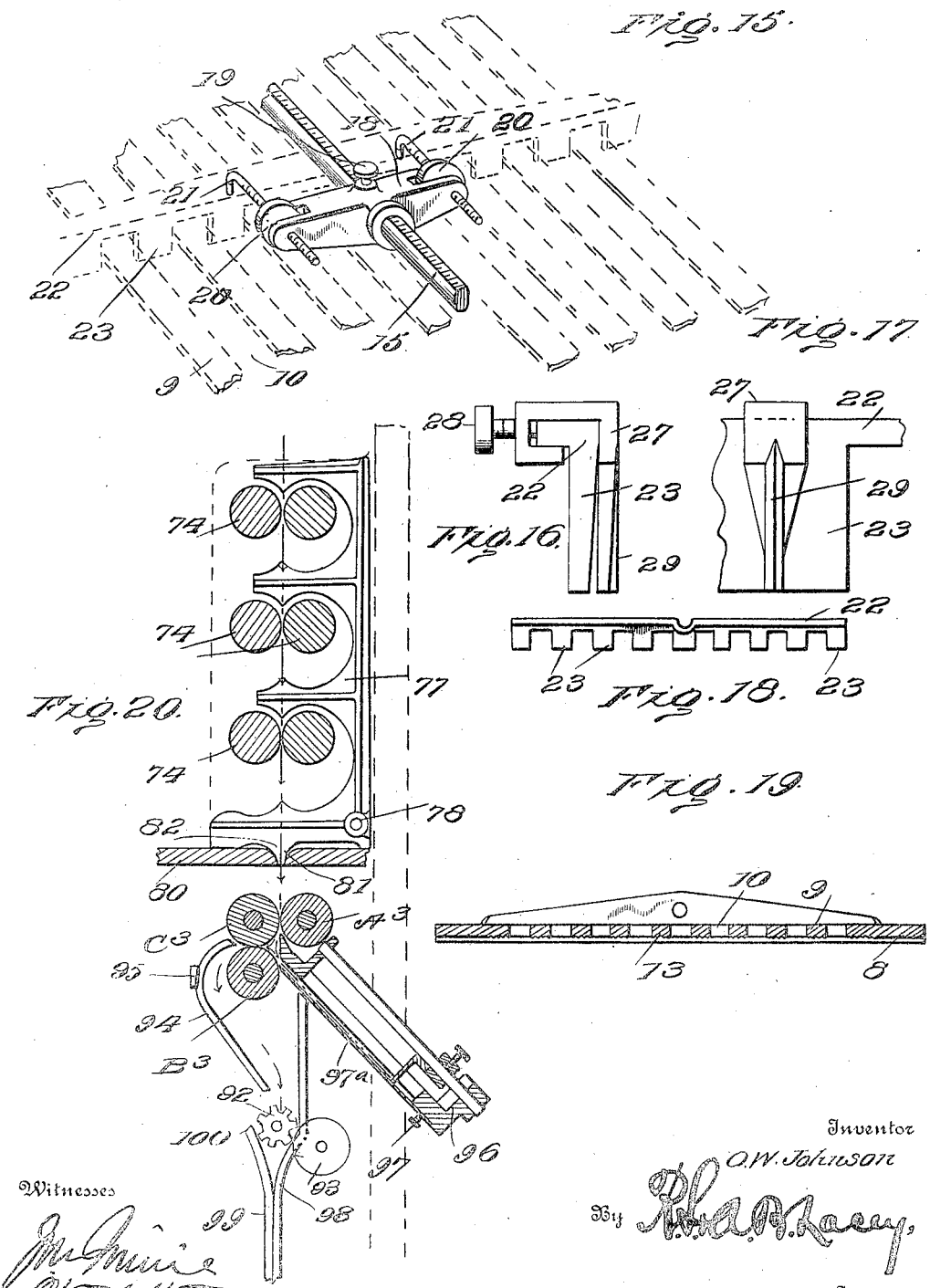

No. 893,629. PATENTED JULY 21, 1908.
O. W. JOHNSON.
PAPER FOLDING MACHINE.
APPLICATION FILED FEB. 7, 1907. RENEWED NOV. 16, 1907.
11 SHEETS—SHEET 11.
*Fig. 21.*
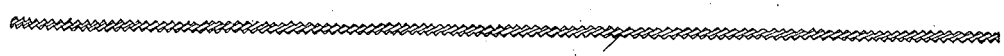
*Fig. 22.*
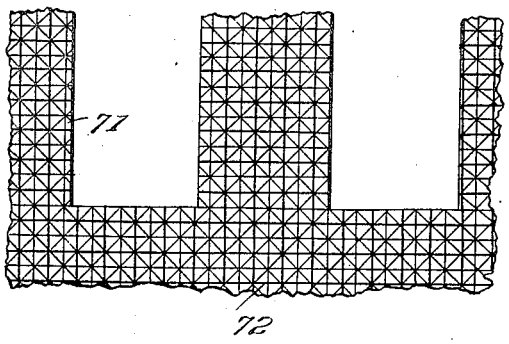
*Fig. 24.*
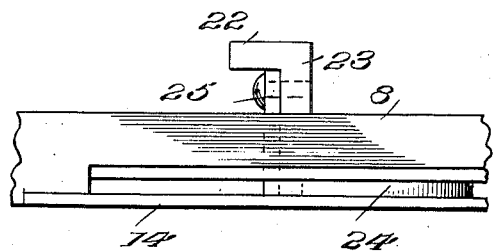
*Fig. 23.*
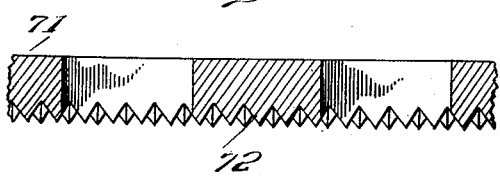
*Fig. 25.*
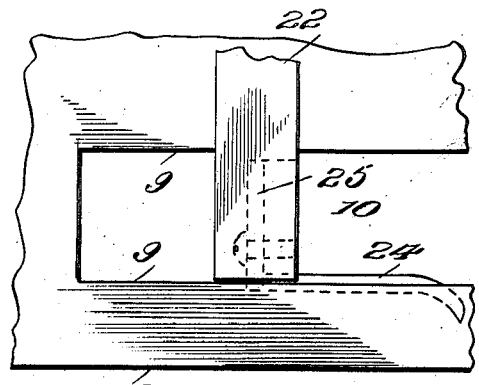
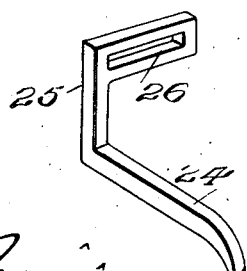
*Fig. 26.*
Witnesses
Inventor
O. W. Johnson
By R.&A.B.Lacey,
Attorneys

UNITED STATES PATENT OFFICE.

OLIVER W. JOHNSON, OF CLEVELAND, OHIO, ASSIGNOR TO THE CLEVELAND FOLDING MACHINE COMPANY, OF CLEVELAND, OHIO, A CORPORATION OF OHIO.

PAPER-FOLDING MACHINE.

No. 893,629.   Specification of Letters Patent.   Patented July 21, 1908.

Application filed February 7, 1907, Serial No. 356,288. Renewed November 16, 1907. Serial No. 402,534.

*To all whom it may concern:*

Be it known that I, OLIVER W. JOHNSON, citizen of the United States, residing at Cleveland, in the county of Cuyahoga and State of Ohio, have invented certain new and useful Improvements in Paper-Folding Machines, of which the following is a specification.

This invention relates to that class or type of paper-folding machines that operate upon the sheet buckling principle.

The primary object of the invention is an efficient machine of this character designed for the printing and book-binding trades generally and more particularly for that class of printers who have heretofore been compelled to depend, for this part of their work, upon the unsatisfactory and unreliable manual services of boys and girls who work to-day and cannot be found to-morrow, making the promised delivery of goods uncertain in those shops that cannot afford to keep a large number of "hands" constantly employed.

A machine of this character, to be satisfactory and fulfil the requirements of the trade, must be compact, simple, durable, and comparatively cheap to manufacture so as to be within the reach of all classes of printers, and it must be capable of making the (so-called) book folds of four, eight, and sixteen pages, each fold at right angles to the fold preceding, and also susceptible to adjustment, whereby it may make one, two, or three parallel folds, and the invention has for its object a machine which will successfully meet this standard and which will be so constructed as to be readily convertible, and without the necessity of a machinist's services, especial tools, or the detachment or attachment of any parts, from a right-angle folder to a parallel folder, and vice versa.

The invention comprehends a paper-folding machine embodying the following new and useful mechanisms with their novel and advantageous individual and correlated functions, to wit, a mechanism for producing the first fold in a sheet; mechanism for producing a second or (and) third fold parallel to the first, and which I hereinafter refer to generally as the parallel folder; a paper slitting attachment immediately following and for use in connection with the first folder and particularly when the latter has prepared the sheet for a second fold at right angles to the first fold; an automatic feed mechanism adapted to pass the folded sheet from the first folder to a second folder and so arranged that it may be readily swung out of the way so that it may be replaced by the parallel folder; a second folder adapted to receive the once-folded sheet from the said feeding mechanism and fold it at right-angles to the first fold; a second and self-alining, automatic feeding mechanism between the second folder and a third folder and adapted to pass the sheet from one to the other, this last-named feeding mechanism being hereinafter distinguished from the first-named by the terms "down-feed" and "cross-feed;" and a third folder adapted to fold the sheet again at right angles to the second fold and to deliver it into an automatically extensible stacking mechanism.

A further object of the invention is an improved construction and arrangement of buckling plates whereby the friction and adhesion of the paper to the surface of said plates is reduced to a minimum and the electric conditions, so fatal to the commercial introduction and successful operation of this class of folding machines, are entirely removed, and whereby the sheet, as it is fed in between the primary and secondary plates, is held in an even, straight line and when buckled between the rolls to produce the fold is caught by said rolls in an absolutely true position.

A further object is, in a machine of this character, the provision of metal ends on all the rolls of the folders, such ends being turned to a true surface whereby the pressure of the boxings or journals and the pressure of roll against roll cannot cause one end of same to flatten with the consequent non-alinement and the result of causing the sheet to skew into an angle untrue to the correct fold, this feature being especially important where a soft or elastic material is used in the roll construction.

Another object of the invention is a paper-folding machine in which the rolls of each folder are disposed in triangular arrangement with two of the three rolls in peripheral contact with the third and out of contact with one another, the said third roll having a yielding surface such as felt or rubber, while the other two are of wood or similar hard or unyielding substance, so that the paper in its traverse to and from the buckling plates, will always pass between one yielding and one unyielding roll, thereby effecting the best results.

A further object of the invention is a cross-feed mechanism which will meet all the conditions peculiar to this type of machines, and which will, therefore, receive, at any time, from the first folder, a sheet of any size within the limits of the machine, and quickly pass it down away from said folder, and keep it properly closed together, and gently but effectively pressed on to the cross-feed device of this portion of the machine, so that it will be delivered into the vertically-disposed second folder straight and true and with its folded edges exactly at right-angles to the line upon which the second fold is to be made.

A further object is to provide, in a paper-folding machine, a marking or slitting device which will automatically cut a sheet into two or more distinct parts, or produce cuts at intervals in a sheet and leave short spaces of paper uncut to hold the partially severed parts together and at the exact point where it is intended to make the second fold, thereby not only insuring that the second fold in the sheet is made true and absolutely accurate, but also providing that the third fold is made without buckling in the corners. Owing to the inelastic nature of paper where folded several times, one fold at right angles to the preceding, the last folds will wrinkle in the corners at the inside of the fold at the folded edges, and the purpose, and result, of the slitting device is to prevent this wrinkle by making the folded edge as nearly flexible as the unfolded edges.

A further object is a slitting device of this general character which will be easy of access, removable, and adjustable to cut, mark, or slit at any place on the sheet that is desired. And a further object is a slitting device of this character which is so mounted on, or correlated with, the cross-feed mechanism, that they both together may be swung to an inoperative or to an operative position, it being recognized that the slitter will not usually be needed if parallel, and not right-angle, folding is being performed.

The invention also has for its object a cross-feed conveyer upon which the folded edge of the once-folded sheet rests as it is fed transversely to the second folder, which conveyer (belt) will receive and deliver on a horizontal line and be susceptible of an elevating or lowering adjustment to such an extent that different papers may be entered into the second folder at the proper angles peculiar to their particular textures and be folded accurately.

The invention also has for its object a down-feed mechanism interposed between the second folder and the third folder which is below the second, and so constructed and arranged as to be capable of receiving the sheet at any time from the delivery rolls of the second folder and automatically aline it and positively feed or deliver it in an absolutely correct position to the receiving rolls of the third folder.

The invention also has for its object an improved mechanism for producing the third fold in the sheet, which will feed all of the layers or plies of the twice-folded sheet properly into the buckling plates of the third folder in the manner hereinafter specifically set forth.

The invention also has for its object certain new and useful adjuncts for the buckling plates whereby the paper may be guided accurately against an adjustable stop device so as to impede its movement and effect the buckling operation, and whereby, whenever desired, the advancing edge of the sheet may be arrested at one or more points, as will be hereinafter set forth. And the invention further has for its object certain new and useful details of construction and arrangements and combinations of parts that, while, in a sense ancillary to the main features above set forth, are nevertheless important points of construction that enter largely, and in some instances indispensably, into the successful operation of a machine of this character.

In connection with the following detail description of the parts, reference is to be had to the accompanying drawings, in which:

Figure 1 is a side elevation of the machine; Fig. 2 is a front elevation thereof; Fig. 3 is a vertical longitudinal sectional view through the entire machine; Fig. 4 is a horizontal sectional view on the line 4—4 of Fig. 2; Fig. 5 is a similar view on the line 5—5 of Fig. 2; Fig. 6 is a horizontal sectional view, the section being taken above the rolls of the third folder; Fig. 6ª is a view, in the nature of a diagram, of the ends of the rolls of the third folder; Fig. 7 is a detail top plan view of a portion of the slitting mechanism; Fig. 8 is a transverse sectional view of said slitting mechanism; Fig. 9 is a top plan view of the slitting mechanism; Fig. 10 is a fragmentary top plan view illustrating the rolls of the second folder and the feeding mechanisms that are adapted to pass the folded sheet after the first fold has been made to the second folder, and after the second fold has been made, to the third folder; Fig. 11 is a detail side elevation, upon an enlarged scale, illustrating the adjustable mounting for the cross feed mechanism and how it may be held either in an operative position or in an inoperative position out of the way of a parallel folding mechanism; Fig. 12 is an enlarged detail view illustrating the stacker for the folded sheet; Fig. 13 is a detail view, partially diagrammatic and partially in section, illustrating a portion of the first folder; Fig.

14 is a detail view illustrating one of the stacker rolls; Fig. 15 is a detail perspective view, partly in full lines and partly in dotted lines, illustrating the adjustable mounting for the buckling stop; Fig. 16 is a detail view of an attachment for said stop shown applied; Fig. 17 is another view of the device illustrated in Fig. 16, Fig. 16 illustrating the said device in side elevation, while Fig. 17 is a face view; Fig. 18 is a detail view of one of the stops detached and on a reduced scale; Fig. 19 is a detail transverse section of a portion of a buckling plate; Fig. 20 is a detail vertical transverse section, illustrating the rolls of the third folder and the means for feeding the paper to such rolls, together with a gage for the said feeding mechanism; Fig. 21 is a detail transverse sectional view of one of the secondary plates for the buckling device; Fig. 22 is a face view of a fragment of the buckling plate, used particularly in connection with the second and third series of folding rolls; Fig. 23 is a transverse sectional view of the plate illustrated in Fig. 22; Fig. 24 is a detail or fragmentary view, illustrating a guide for the advancing corners or side edges of the sheet as it is fed between the buckling plates; Fig. 25 is a top plan view of this guide; and, Fig. 26 is a detail perspective view of said guide detached; Figs. 27 and 28 are a detail side elevation and end view of one of the rolls, partly broken away to show the structure.

Corresponding and like parts are referred to in the following description and indicated in all the views of the drawings by the same reference characters.

The framework of my improved paper-folding machine embodies the two open frames or castings 1 and 2 that are connected together by the transverse spreaders 3 and that are provided with the bracket 4 upon which to journal certain portions of the movable elements. The drive shaft 5 may be rotated by means of pulleys or by an electric motor, or in any desired manner, fast and loose pulleys 6 and 7 being mounted on the shaft in the present instance. Mounted directly upon the drive shaft 5 is the roll $A^1$ which is the main roll of the first folder. Coacting with this main roll are the two rolls $B^1$ and $C^1$, the roll $B^1$ being mounted in suitable ways in the framework of the machine above the main driving roll $A^1$ and the roll $C^1$ being located at the rear of the rolls $A^1$ and $B^1$ as best seen in Fig. 3. As has been above stated, it is the purpose of my invention to provide all of the rolls with metal ends, such as those indicated at $6^a$ in Fig. 6, and it is also the purpose to have one of every two engaging rolls made with a periphery of felt, rubber, or other yielding substance, intermediate of the metal ends, while the intermediate portions of the other two rolls are constructed of wood or some other unyielding substance. Hence, in the rolls $A^1$, $B^1$ and $C^1$, it will be understood that the roll $A^1$ has a felt or rubber periphery, while the rolls $B^1$ and $C^1$ are relatively hard. The rolls $B^1$ and $C^1$ are out of contact with each other, but both are in peripheral contact with the main driving roll $A^1$. The paper sheet to be folded is fed over the surface feeding table $a$ and between the side gages or guides $b$ on to a surface conveyer or feeder which, as best seen in Fig. 3 is a pair of rollers driven from the main roll $A^1$, or its shaft 5 by means of a sprocket connection $43^a$, as indicated in Fig. 2. As the paper is fed in between the rolls $A^1$ and $B^1$, it meets, as best indicated in Fig. 13, the toe 11 of a primary buckling plate 8. This plate is arranged at an inclination to the surface feed, as indicated in Figs. 1 and 3, and embodies a series of parallel bars 9 that are spaced from each other to provide the intervening spaces 10.

As seen in Fig. 13, the primary plate 8 is provided, in juxtaposition to the rolls $A^1$, $B^1$ and $C^1$, with a heel portion 12 which is in substantial alinement with the line of feed and is convex or curved, as shown, and the said primary plate 8 is also formed with a series of ribs 13, both in front of the heel 12 and extending from said heel upwardly and rearwardly on the lower surface of the said plate. As the paper is fed in past and around the heel 12, it meets the secondary buckling plate 14, which is secured to the lower surface of the primary plate 8 and is spaced therefrom to provide a passage for the feeding-in of the sheet between the said two plates.

As shown best in Fig. 21, the secondary plate 14 is very finely ribbed or corrugated so as to present, within reasonable limits a minumum of contact surface to the paper and it is preferably of zinc. The primary plate 8 supports a rod 15 by means of apertured ears or brackets 16 and 17, and upon this rod 15, a carriage 18 is mounted to slide and is held at different adjustments along the rod by means of a set screw 19. The rod is graduated, as best seen in Figs. 2 and 15, so as to enable the operator to accurately adjust the carriage along the rod. The carriage 18 is provided with two oppositely extending arms which are slotted and which receive adjusting nuts 20 through which and through said arms hooked bolts 21 extend, so that the said bolts are arranged for independent adjustment or extension on the carriage. 22 designates a stop which is angular in cross section, as shown, and is provided with a series of fingers 23 adapted to extend down into the several spaces 10 of the primary plate 8. The purpose of this stop 22 is to impede the on-coming sheet, as it is fed in between the plates and arrest its motion, so that the further feeding in of the sheet will cause the same to buckle and be caught by the rolls $A^1$ and $C^1$ to form the first fold. It is obvious, then, that the stop 22 should be adjustable, and for this purpose the carriage 18 is provided, so that the stop may be adjusted as a whole with respect to the buckling plates. In addition to the adjustment of the entire stop, the bolts 21 (the hooked ends of which are fastened in apertures in the cross bar of the stop), as indicated in Fig. 15, may be screwed in and out, one independently of the other, so that one end of the stop may be placed in a somewhat advanced position with respect to the other.

In order to accurately guide the paper as it is fed in between the two plates 8 and 14, so that it may be properly alined against the stop 22, the said stop may be provided at its ends, as best seen in Figs. 24, 25 and 26 with curved guide arms 24 which are formed integral with brackets 25 that are slotted at 26 and are held to the ends of the stop 22 by means of screws, as shown, the slot 26 enabling the curved guide 24 to be adjusted laterally to meet different conditions. It may also be desirable to stop the in-coming sheet at different points, that is, to have some means that will strike the advancing edge of the sheet at one or more points, rather than throughout its entire extent. For this purpose, I may use the attachment illustrated in Figs. 16 and 17, or similar attachment, said attachment consisting of a hooked finger 27 which is adapted to be adjustably held along the stop by means of a set screw 28 and which finger extends down in front of the fingers 23 of the stop at the desired point, and is provided preferably with a tapered or beveled front edge 29, as shown.

The paper having been fed in between the buckling plates 8 and 14, and stopped, is caught, as has been above stated between the rolls A¹ and C¹ and is crimped by them to form the first fold and is then, by the continued motion of said rolls pressed firmly between them to effect a proper fold and is fed downwardly through such rolls to the cross feed which is intended to carry them to the second folder.

As the slitting attachment in the preferred arrangement of parts, forms a practically permanent element of the cross feed, I shall describe said slitting attachment in connection with said feed, reference being had especially to Figs. 2, 3, 4, 5, 6, 7, 8, 9 and 11.

The paper in its downward movement from the first folder meets at the outset the slitter 31 and its companion roll 30 and passes between them and the coacting guide rolls 32 and 33. These slitters are arranged along their respective shafts 34 and 35 at the direct point where the second fold is to be made at right angles to the first fold and in order that they may be adjusted to the required point, they are held upon their shafts by screws as shown. While the slitting devices, may, if desired, sever the once-folded sheet into two distinct parts, it is mainly intended to slit them at intervals so as to leave integral spaces which will hold the partially severed parts together when the subsequent folds are being formed, and to this end one of the slitting devices is provided with notches on its periphery as indicated in Fig. 8. These slitters are adapted to run at precisely the same speed as the main driving roll A¹, so that they will not tear the paper while it is being slit.

It is manifest that the slitting device described may have its edge to formed, that is, sufficiently dull as so merely score or mark the sheets instead of slitting them.

The paper, after being slit or scored, as described, continues downwardly into the uppermost pair of cross feeding rolls 36 and 37. Three pairs of these rolls are shown in superposed relation and extending horizontally. The rolls 36 and 37, as well as the shafts 34 and 35 of the slitters, are held within a casing or framework embodying two side plates or castings 38 which are held together by spreaders 39 and which castings are pivotally mounted at their lower ends upon a transversely extending shaft 40 journaled in bosses 41 in the main framework. In order to hold this casing or frame in a vertical position, where it will receive the sheet from the first folder, such position being indicated in dotted lines in Fig. 11, a strut 42 is pivotally connected to one end of one of the spreaders 39 and is forked at its other end as indicated in dotted lines in said figure, and is adapted to rest upon one of the spreaders 3 in one of the main framework. When this cross feed is not desired, but is to be replaced by the parallel folder herein described, the strut 42 is disengaged from the spreader 3 and the said casing or frame is permitted to swing forwardly and rest upon the said spreader as indicated in full lines in Fig. 11.

To obtain the best results, the slitters must be driven at the same rate of speed as the main driving roll A¹, as above stated, and the downwardly feeding rolls 36 and 37 of the cross feed mechanism must be driven at a relatively high rate of speed. To secure the proper relative movements in the simplest manner, I provide a train of gearing consisting of the sprocket connections 43, 45 and 63. The connection or sprocket gearing between one of the slitter shafts and the shaft of the next adjacent downwardly feeding roll has a differential gearing, while the gearing 63 between the shaft 40 and one of the lowermost downwardly feeding rolls is also differential, but in opposite proportions so that the following result is effected, namely, the slitter runs at the same rate of speed as the main roll A¹, while the rolls 36 and 37 run at a relatively high rate of speed. The respective rolls 36 and 37 of the respective pairs are geared together as indicated at 46 in Figs. 2 and 9. The paper having been fed downwardly between the rolls 36 and 37 finally meets the transversely operating portion of the cross feed mechanism, this consisting of a belt 47 which is located at the bottom of the series of down feeding rolls and which is supported by a transversely extending casing 48 which is pivotally mounted at one end so as to be adjusted in a vertical plane, on the stub shaft 49 mounted in a bracket 50 of one of the side plates or castings 38 of the cross feed casing. The belt or conveyer 47 travels at one end over a driving pulley 51 and over a series of smaller pulleys 52 which maintain it always traveling in a true even plane, and in order to adjust the casing 48 vertically, an adjusting screw 53 is mounted to extend upwardly through a small ledge formed on the opposite side plate 38, said screw bearing against the lower side of the laterally projecting lug 54 formed on a side of the casing 48, as best seen in Figs. 2 and 5. The belt 47 may have its tension adjusted by means of the slide 53$^a$ carrying a roller at one end, as shown in Fig. 2 and mounted to move along the flanges 54$^a$ of the case 48.

The belt 47 is driven from the shaft 40 by means of a bevel pinion 55 on the stub shaft 49 and a similar pinion 56 on the said shaft 40. This latter shaft is provided at one end with a bevel pinion 57 meshing with the loose pinion 58 on the vertical shaft 59 and arranged to be operatively connected or made fast to said shaft by means of a set screw clutch 60. The shaft 59 is driven by means of a bevel pinion 61, said pinion meshing with a similar pinion 62 on the main driving shaft 5. Up to this point, then, it will be seen that the paper, after it has received one fold, has its two sheets or plies fed downwardly through the successive pairs of rolls 36 and 37 on to the transversely moving belt 47, and in order that the paper shall not kick up at one end as it strikes the belt, it is to be particularly understood that the rolls 36 and 37 are set just far enough apart to support the paper and prevent it from bending down by its own weight and are not close enough together to present any appreciable friction against the paper to retard the transverse movement thereof towards the second folder.

As the once folded sheet is carried in a true horizontal plane and transversely of the machine towards the second folder, it passes through the comparatively narrow slot 64 in the left hand casting or side plate 38, so that its side edges will be kept closely pressed together and it also passes between rolls 65 and 66, which form extensions of the rolls 36 and 37, as best seen in Figs. 4 and 10. In addition to these extension rolls 65 and 66, which feed the paper directly into the second folder and which for this purpose extend close to the rolls of the second folder, I may provide shields 67 which are bolted to adjacent side plate or casting 38.

As the paper is fed transversely by means of the belt 47, while it is supported in this movement through the instrumentality of the rolls 36 and 37 and their extensions 65 and 66, it next comes into engagement with the vertically disposed rolls of the second folder, said rolls being designated A$^2$, B$^2$ and C$^2$, respectively. The rolls A$^2$ and C$^2$ of this series are the unyielding rolls, while the roll B$^2$ is yielding in its nature. The roll A$^2$ is the main roll and receives its motion from the main drive shaft 5 by means of a bevel pinion 68 on said drive shaft, said pinion being loose on said shaft and clutched thereto by the set screw clutch 69 and meshing with the bevel pinion 70 on the upper end of the shaft of the roll A$^2$, as seen best in Fig. 2.

Passing between rolls A$^2$ and B$^2$, the paper passes between the buckling plates of the second folding mechanism, the primary plate having a flat heel as best seen in Fig. 10 in contradistinction to the bulge or convex heel 12 of the first folder. As the sheets have by this time become somewhat highly charged with static electricity which is a feature that has been fatal to machines of this character, I have found by actual experiment that the primary plate 71 of this second folder should present as small a contact surface to the paper as possible and that this surface should be irregular and not along well defined lines. Hence, as best seen in Figs. 22 and 23, the contacting surface of the primary plate 71 is serrated or roughened, preferably by sharp diamond shaped fingers 72 which present sharp points to the paper and which overcome and obviate entirely the electrical conditions, in connection with the secondary plate 73 which is similarly formed. The paper, after being fed in between the plates 71 and 73 is arrested by the stop device 70$^a$ of these plates and the sheet is then caught between the crimping rolls B$^2$ and C$^2$ so as to produce a second fold at right angles to the first.

The third folder is in a plane below the second folder and in order to feed the twice-folded sheet to the third folder, I provide the three pairs of obliquely extending rolls 74, one pair above the other with their lower rounded ends in juxtaposition to and in alinement with the rolls B$^2$ and C$^2$. These rolls 74 and their concomitant parts comprise the down feed mechanism and the said rolls are journaled at their upper or rear ends only in bearings 75 within a portion of the main framework. They are geared to move simultaneously by means of the pairs of sprocket connections 76. The position of these rolls 74 at a low angle to the horizontal, provides that the paper, after the second fold, will be drawn inwardly or to the left of Fig. 1 until the twice-folded sheet has been entirely liberated from the rolls B² and C². The horizontal movement of the twice folded sheet must be arrested exactly at this point and such movement converted into a vertical and downward movement, and for this purpose I provide the adjustable gage 77, which, as best seen in Fig. 20 is provided with a series of superposed fingers extending between the respective pairs of rolls 74 and serving as a stop to the paper. This gage 77 is adjustably mounted upon a threaded adjusting rod 78 which has a handle 79 at one end for turning it, and the bottom of the gage 77 rests level upon the level surface of the bottom plate 80, said plate being provided with a slot 81, and the gage being provided with a beveled lug 82 adapted to extend down into said slot. As soon as the paper comes into contact with the fingers of the gage 77, the continued rotation of the rolls 74 will feed the paper downwardly in a self-alined manner through the contracted slot 81, and to the third folder; and as the slot 81 is beveled or contracted as shown, it will keep the sheets pressed together, so that they will enter between the rolls of the third folder.

The third folder embodies the rolls A³, B³ and C³, of which the rolls A³ and B³ are unyielding and the roll C³ yielding. The roll A³ is the main roll of this series and is driven directly from the main roll A² of the second folder, by means of a bevel pinion 83 on the lower end of the shaft of the roll A², and a similar pinion 84 on the shaft of the roll A³, as indicated in Figs. 1, 2 and 6. As indicated in Fig. 6ª, the roll A³ is provided with a gear wheel 85 which is operatively connected with the roll B³ through the instrumentality of an idler gear 86 and the gear 87 on the shaft of the roll B³. The roll C³ is an idler, and is driven by the friction of the paper passing between it and the respective rolls A³ and B³, according as the paper is being fed into the buckling plates of the third folder, or out of said plates into the stacker. The shaft of the roll A³ is connected by a sprocket and chain gearing 88 with a stub shaft 89 (see Fig. 1), said stub shaft and the lowermost shaft of the roll 74 being provided with pinions 90, so that said rolls 74 are driven by means of the main roll A³ of the third folder. As the paper is fed downwardly through the contracted slot 81, it is fed by the rolls A³ and C³ into the buckling plates 96 of the third folding mechanism, the secondary plate of these two being detachable by means of the set screw 97, as best seen in Fig. 20. The primary plate of these two has a substantially flat or slightly recessed heel as also seen in this view. After the twice folded sheet has been arrested in its motion by the stop devices of the third folder, it is caused to buckle between the crimping rolls B³ and C³ and is thence drawn outwardly by means of said rolls and the third fold produced.

As the thrice-folded sheet is delivered from the rolls B³ and C³, it is engaged by means of a series of curved guide fingers 94 that are all supported by means of a transverse bar 95, (see Fig. 1) and these curved guide fingers 94 direct the folded sheet down into and between the delivery rollers 92 and 93. The roller 92 is fluted, as shown best in Fig. 12 and receives its motion from the shaft of the idler 86 by means of sprocket connection 91. The paper finally passes down into and between upright stacking arms 98 and 99, the said arms 98 being stationary and extending up past the two rollers 92 and 93 by means of grooves in the roller 93, while the stacking arms 99 are relatively movable. The lower ends of the stationary stacking arms 98 are held within brackets 101 which are formed with upper and lower series of rollers 103 upon which the lower or main stacking boards 102 are mounted to travel in a horizontal plane. These boards support the auxiliary and vertically adjustable stacker boards 104, which are supported by means of set collars 104ª upon the fingers 99 and coacting uprights 105, and the said boards 102 and 104 are slotted or spaced from each other transversely, so that the said boards, together with the relatively movable stacking arms 99 may be moved outwardly as indicated in Fig. 12 with respect to the stationary arms 98 so as to effect the extension of the stacker as the sheets accumulate. The upper ends of the stacking arms 99 are curved outwardly as shown.

As the thrice-folded sheet engages the guides 94, it is thereby deflected downwardly and received in the fluted roll 92 which moves at the same surface speed as the delivering rolls B³ and C³. At this point, the sheet is fed into the two rolls 92 and 93 on down until the advanced edge engages the stacking arms 99 and 98 and on down until the said edge reaches the platforms or boards of the stacker. This stacker board or bottom is so set previous to the arrival of the sheet that it will be far enough from the junction of the rolls 92 and 93 to permit the loose or top edge of the sheet to just clear the said rolls 92 and 93, and the bend in the guide having caused a strain to be exerted on the sheet at the top end, the edge of the sheet is thereby caused to bend towards the first flute in the roll 92 that comes around to it after the edge has been released from the engagement of the two rolls. The flutes are of such a nature that they will hook over the edge of the sheet, and as the roll continues to turn around, it will force the sheet to bend downward until the lower edge engages the stacker board. This should leave the top edge of the sheet still too high to escape the bottom periphery of the roll 92, so that the flute will continue to exert the same influence over the edge and cause it to be shoved to or delivered on the rear side of it. And when it finally becomes clear of the said flute, then it has been bent backward against the curved upper ends 100 of the rods 99 with the roll 92 between it and the place it formerly occupied. It therefore follows that it can never return to its former position and thus room is left for the next sheet to enter. If it is desired that the sheet be fed directly to the stacker after a second fold has been made at right angles to the first, without producing a third fold in the sheet, this result may be accomplished by merely removing the set screw 97 and detaching the secondary plate 97ª which it normally holds. It is then obvious that the twice-folded sheet will be fed downwardly through the rolls $A^3$ and $C^3$ and delivered directly to the stacking arms.

The rolls of all of the folders are provided with slots in their bearings, so that the rolls may be pressed together.

At the outset of the specification, it was stated that one of the objects of the invention was a machine of this character which could be easily converted from a right-angle folder to a parallel folder, and vice versa. The detail construction to effect this result is best illustrated in Figs. 1, 3 and 11. When the cross feed mechanism is swung to the inoperative position illustrated in full lines in Fig. 11, it leaves room for a parallel fold mechanism which comprises two rolls 106 and 107 that are journaled at their ends in and between two arms 108 pivotally supported by the main framework and adapted to swing in a vertical plane. The said arms 108, carry, beyond the rolls 106 and 107 a set of buckling plates 109 adapted to assist in producing a second fold in the sheet parallel to the first fold. The said arms 108 also carry an oppositely facing set of buckling plates 110 adapted to assist in making the third fold of the parallel series.

When not in use, the castings or arms 108 depend from their pivot points and by their own weight are held out of the way of the cross feed mechanism and in the position illustrated in dotted lines in Fig. 11. In order that the said parts may be held in the full line position illustrated in Fig. 11, one or both of the arms 108 are provided with spring latches 111 that are adapted to be sprung under latches 112 of the main framework, and the tension of these spring latches to securely hold the parallel folder in operative position may be regulated by means of set screws 113.

When in the operative position illustrated in full lines in Fig. 11, the roll 107 engages the roll $C^1$ and is driven frictionally by it, the roll 106 being driven in like manner by the roll 107. Hence, as the first fold is produced between the rolls $A^1$ and $C^1$ the folded sheet is fed into or between the buckling plates 109 and then out again between the rolls $C^1$ and 107 and thus delivered to the buckling plates 110, the motion of the paper being arrested and the third fold being formed between the rolls 106 and 107. If it be desired to form only two folds in a sheet, one fold parallel to the other, the secondary plate of the set 110 may be removed and the twice-folded sheet will then merely pass out over the roll 106. In order, now, to make clear the advantages resulting from my invention and the details of construction hereinbefore set forth, and in order also to point out the requirements for a successful machine of this character and show how my machine fulfills these requirements, I deem it expedient to give a résumé of the operation of the machine and a description of the traverse of the sheet of paper from its introduction into the machine to the time it is delivered as a folded sheet.

The sheet to be folded first passes into the rolls $A^1$, $B^1$, and $C^1$ from the small surface feeders C operated from the main roll $A^1$ by means of the sprocket gearing 43ª. These rolls $A^1$, $B^1$ and $C^1$ are mounted in triangular arrangement with the axis of the roll $A^1$ in a slightly lower plane than the axis of the roll $C^1$. The sheet is fed first into or between the buckling plates and is arrested at the proper point by an adjustable stop device and so caused to buckle by the continued inward feed that it will be caught by the rolls $A^1$ and $C^1$ and crimped to produce a perfect first fold and thence delivered downwardly to the cross feed mechanism. In passing between the buckling plates 14 and 8 of the first folder, it is to be particularly noted that these plates present the least amount of friction to the paper when it is moved between them and also provide the least possible chance for the sheet to bend or wrinkle up when the onward movement of the sheet is stopped and the buckle is made. It is to be noted that the primary plate 8 of the first folder has a curved heel 12 which is located between a ridged or ribbed leg portion and a similar foot portion. By this means very little metal is presented to the surface of the paper and at the same time the primary and secondary plates are close together and prevent the paper sheet from wrinkling up or doubling as it travels up to the stop mechanism, and the heel 12 holds the paper as it is fed in in a gradual curve and it is held in an absolutely even straight line. The paper then passes to the slitting attachment. By introducing a slitter at a point where it can engage the first fold as it is delivered from the same and cut it in slits from one and one-half inches to two inches long, leaving very small uncut portions between said slits, to hold the semi-severed parts together and in alinement, the fold is caused to come at the exact line where there is the least resistance. Hence, when this slitted sheet is next fed through the second folder the buckle is made with the same degree of accuracy as if all sides of the sheet were cut, allowing the uniform slitting of all the sheets involved in this fold and thus producing a correct fold which would otherwise not be possible in view of the inelastic qualities of the folded edge of the paper. In order that this slitting attachment may be very effective in this machine, the said slitting device is made adjustable so that it may cut or perforate any width of paper used and be removed whenever desired from an operative position to an inoperative position. Hence, it is embodied in or related to the adjustable or removable cross feed mechanism because when one is not wanted, the other is useless also, and when the cross feed is wanted and the slitter is not, then the slitter may easily be removed from the cross feed frame. When in the operative position, all motion of the cross feed mechanism, together with the slitter, may be caused to cease by disengaging the clutch 60 from the bevel pinion 58. It is also to be noted in connection with the cross feed and slitting attachment that one set of gears and sprockets shown answers the purpose of distinct pieces of mechanism, and that by the system of differential sprockets above described, a high speed is imparted to the cross feeding device, while the speed for the slitter is reduced to that of the main roll $A^1$ of the first folder. After being slit, the once-folded sheet passes to the cross feed mechanism, which is so arranged that the rolls do not touch each other, but are set at such a distance apart that they rub on the sheet of paper, but do not forcibly hold or convey it as would be the case if they were set tightly together. After it finally reaches the belt 47, it is positively carried in a horizontal direction and delivered to the vertically disposed second folder, in a compact form with the edges close enough together to prevent spreading or changing of position. As the slight friction on the sides of the paper by the rolls 36 and 37 keeps the once-folded sheet on the belt, it follows that the said sheet will be truly delivered to the second folder and cannot change its position, as the rolls 36 and 37 present practically no resistance to this cross motion of the sheet. The sheet is thence fed transversely into the vertically disposed second folder. In order to produce a machine that will fold the right angle book fold for four, eight and sixteen pages, I have found it necessary to have the second folder so arranged that it will occupy the least amount of space and be located so as to require the least amount of motion to drive it, and deliver the folded sheet from the first folder to it, and also so set that the same roll receiving the power from the driving element, such as the main shaft 5, may transmit it direct to the other rolls of its series and also to the third folding mechanism below. It is also necessary that the second folder be set in such relation to the fold it must make, that it will receive, fold, and deliver the sheet to the third folder in the shortest possible time and over the shortest possible space. These requirements, I believe are completely fulfilled by the location and arrangement of the second folder consisting of the rolls $A^2$, $B^2$ and $C^2$.

After the sheet has been folded twice, it is necessary to provide some means for passing the twice-folded sheet to the third folder, and it is essential that this feeding mechanism receive the sheet at any time, with no appreciable resistance, yet with sufficient friction on the paper that if the machine is stopped, the sheet stops also and does not fall out or change its position from that in which the moving parts left it. At the same time, it must be positively a force feed and yet not tear the paper if something should engage the latter and stop its further progress without stopping the movement of the device at the same time. It must be able to line up the sheet true to the receiving rolls of the third folder, so that it will enter exact and be folded true and be delivered in that condition closely pressed together to the receiving elements of the third folder. Furthermore, it must be adjusted to any size sheet. For these reasons, I have provided the rolls 74 that are run in series with one pair above another and set at a low angle to the horizontal plane, (see Fig. 1) with the lowermost end unsupported and in contiguity with the delivery rolls of the second folder, and so arranged that they will receive the delivered sheet between their rounded front end securely and simultaneously. The pairs of rolls 74 in this series are set so close to each other that the sheet is closely but not rigidly held between them, just tight enough that the spring of the paper will hold its own weight. Thus the rolls, being set at an angle and running at a high rate of speed will carry the paper as soon as released from the second folder downward and at the same time away from said second folder and will bring the first-delivered edge of the sheet against the arms of the gage 77 set to receive it, and not allow the last-released edge of the sheet to pass away from the second folder, for it must be just released from the delivery rolls of said second folder. Hence the rolls 74 will act as guides to keep the edges of the sheet from spreading and to direct its edges to the receiving members of the third folder, as the angle rolls 74 force it down to them and clear the way for the next sheet.

The buckling plates of the second and third folders possess different characteristics from the buckling plates of the first folder, said differences residing in the contact face and heel of the primary plate. It will be remembered that the primary plate on the first folder is described as having a round convex heel and a longitudinally ribbed face. The primary plates of the second and third folders are different in these respects for the reason that the conditions in the making of the second and third folds are found to be entirely different from those of the first fold. The placing together of two or more sheets makes a new combination that renders the first arrangement to handle the sheet abortive, as it produces requirements needing different applications of the same principle in order to handle the problem successfully. The sheet at the second and third fold having passed through two or three sets of revolving rolls is usually well charged with electricity. In the first fold the sheet has but one operation performed on it, and is usually not very heavily charged and also has no other pressure but that of its own weight, whereas the second and third fold have eight and sixteen pages, respectively, to handle and as they have just been folded, the sheets have a tendency to bulge or spring outwardly against the opposing faces of the plates, hence, if the ridges or ribs 13 were to be used with the buckling plates of the second and third folders, the sheet on the outer side would be depressed between said ridges and thus create a wrinkle when the sheet buckled. To overcome or avoid any such contingency the primary plates of the second and third folders are recessed in some form such as that indicated in Figs. 22 and 23, whereby points or small rounded knobs are presented to the depressed sheets so that they cannot be depressed down between them and cause a wrinkle.

In order to make the sixteen page fold, the third folder which embodies the rolls $A^3$, $B^3$ and $C^3$ is necessary, so as to receive the twice-folded sheet and make another fold at right angles to the preceding fold and in the center of the sheet. One of the main draw-backs to this third fold operation heretofore has been the buckling of the sheet when folded and also the uneven condition of the sheets in the fold when the operation of the sheets has been completed, leaving the printed matter so uneven and disarranged as to be unsatisfactory. In order to overcome this difficulty and at the same time produce a machine that would be reasonably cheap in price, I have arranged the third folder as hereinbefore described in detail. It will be seen that by the arrangement described, the power is obtained direct from the main roll $A^2$ of the second folder, bevel pinions effecting a direct connection between the shafts of the main rolls of the second and third folders, then by using the system of gear drive, 85, 86 and 87 on the shafts of the rolls themselves, the system of propulsion is complete. It is to be particularly noted, however, that the roll $C^3$ of the third folder is not driven by any power other than that of friction of the roll by contact of the sheet of paper while it is passing through. In making this third fold, it is necessary to overcome the irregular condition of the inside sheets when folded, so that the printed matter will lie level and line up true with the rest of the sheets. In order to do this, I use the arrangement or theory, which I have found successful by practice that the outside sheet must be retarded in its movement through the crimping rolls $B^3$ and $C^3$, and to do this, one of these rolls must positively drive and the other be driven by the sheet itself and thus retard said outer sheet, making the inner sheets force themselves into it to propel it through, and thereby compelling all the innermost sheets to fit tight to one another in the angle of the fold and retain all their regularities. Then the folded sheet passes automatically to the stacking mechanism, the operation and advantageous features of which have been pointed out above.

From the foregoing description in connection with the accompanying drawings, it will be seen that I have provided a comprehensive, simple, durable, and efficient paper folding machine for practically all classes of work and particularly from the minimum grade or size of work down to the smallest folds practicable, and one that will fulfil the requirements of a successful machine of this character, as hereinbefore set forth, and one that can be manufactured at a price, owing to its simplicity, that will be within the reach of all classes of printers so that they may be able to compete with the larger concerns upon a more profitable basis which is a desideratum in the printing trade generally, and its allied trade of book-binding.

Having thus described the invention, what is claimed as new is:

1. In a paper folding machine, the combination of mechanism arranged to produce a first fold in a sheet, mechanism for producing a second fold in the sheet at right angles to the first fold, a cross feed mechanism arranged to receive the sheet from the first folder and deliver it to the second folder, said cross feed mechanism including a transversely operating portion, and a downwardly feeding portion, the latter consisting of a series of horizontal rolls arranged in pairs, the rolls of each pair being out of contact with each other and free from pressing engagement upon the two plies of the sheet, whereby they will support the sheet on the transversely operating portion of the feed mechanism without interfering with the operation thereof, and means for actuating the said mechanism.

2. In a folding machine, the combination of coacting rolls and buckling plates adapted to coact therewith, both rolls being provided with metal ends that are in contact with each other, peripherally considered, the remaining portion of one roll being yielding and the remaining portion of the other roll unyielding.

3. In a folding machine, the combination of three folding rolls disposed in a triangular arrangement, two of said rolls being in contact with the third and out of contact with each other, the said third roll being provided with a yielding contact surface while the other two rolls which engage with it are provided with unyielding contact surfaces.

4. In a folding machine, the combination of a plurality of folders adapted to fold the sheet into a plurality of folds of which each fold is at right angles to the preceding fold, an adjustable cross feed mechanism interposed between the first folder and the second folder, and a slitting device attached to said cross feed mechanism.

5. In a folding machine, the combination of a first folder, a second folder adapted to make the second fold in a sheet at right angles to the first fold, a cross feed mechanism arranged to pass the sheet downwardly from the first folder and embodying a transversely movable conveyer adapted to pass the sheet side-wise to the second folder, a slitting device adapted to act on the paper as it is fed from the first folder to the second, and means for producing a relatively high speed on the downwardly acting portion of the cross feed mechanism and a relatively slower speed on the slitter.

6. In a folding machine, the combination of folders, one of which is arranged to produce the initial fold in a sheet and the other of which is arranged to produce a second fold at right angles to the first fold, means for actuating said folders, a cross feed mechanism embodying a series of horizontally disposed rolls adapted to receive the sheet from the first folder and support it unimpeded for a sidewise travel, said cross feed mechanism also embodying a laterally movable conveyer adapted to pass the sheet sidewise to the second folder, and means for operating said cross feed mechanism.

7. In a folding machine, the combination of a plurality of folders, one of which is adapted to produce the initial fold in a sheet, and the other the second fold at right angles to the first fold, the second folder being vertically disposed and in a lower plane than the first folder, means for actuating said folders, a cross feed mechanism below the first folder and adapted to receive the sheet therefrom and pass it downwardly, said cross feed mechanism being provided at its lower end with a transversely traveling belt, the down feeding devices of said mechanism being adapted to support the folded sheet with its lower edge resting upon said belt, and the belt being adapted to move the sheet side-wise into the second folder, and means for actuating said cross feed mechanism.

8. In a folding machine, the combination of a plurality of folders, one of which is adapted to produce the initial fold in a sheet, and the other the second fold at right angles to the first fold, the second folder being vertically disposed and in a lower plane than the first folder, means for actuating said folders, a cross feed mechanism below the first folder and adapted to receive the sheet therefrom and pass it downwardly, said cross feed mechanism being provided at its lower end with a transversely traveling belt, the down feeding devices of said mechanism being adapted to support the folded sheet with its lower edge resting upon said belt, and the belt being adapted to move the sheet sidewise into the second folder, means for actuating said cross feed mechanism, and means for vertically adjusting said belt to different inclinations.

9. In a folding machine, the combination of a plurality of folders, one of which is adapted to produce the initial fold in a sheet and the other a second fold at right angles to the first fold, means for actuating said folders, a cross feed mechanism embodying a transversely movable device adapted to support the sheet received from the first folder and pass it to the second folder, means for actuating said cross feed mechanism with its sheet supporting device, and means for raising and lowering one end of said last named device, as and for the purpose set forth.

10. In a folding machine, the combination of a plurality of folders, one of which is adapted to produce the initial fold in a sheet, and the other a second fold at right angles to the first fold, means for actuating said folders, a cross feed mechanism adapted to receive the sheet from the first folder, and feed the same downwardly and across to the second folder, and embodying a series of rolls, shields between the ends of said rolls, whereby to prevent the corners of the papers from spreading in their progress to the second folder, and means for actuating said cross feed mechanism.

11. In a paper folding machine, the combination of a plurality of folders, one of which is adapted to produce the initial fold in a sheet and the other a second fold at right angles to the first fold, a cross feed mechanism adapted to pass the sheet from the first folder to the second folder and embodying a series of rolls arranged to effect the downward operation of the traverse of said sheet in this movement, a frame within which said rolls are journaled, said rolls being provided beyond the frame at one end with extensions that terminate close to the second folder, and means for actuating said cross feed mechanism.

12. In a paper folding machine, the combination of a plurality of folders, one of which is adapted to produce the initial fold in a sheet and the other a second fold at right angles to the first fold, a cross feed mechanism adapted to pass the once folded sheet to the second folder and embodying a plurality of rolls adapted to produce the downward traverse of this movement of the sheet, the ends of said rolls being located in proximity to the second folder, and the cross feed mechanism embodying a transversely actuating device to carry the sheet horizontally out from the ends of the rolls of the feed mechanism, a frame in which the said rolls are mounted, said frame being provided at one end with a slot adapted to guide the paper and hold it closely compressed so as to prepare it for entrance into the second folder, and means for actuating said cross feed mechanism.

13. In a paper folding machine, the combination of a plurality of folders, one of which is adapted to produce the initial fold in a sheet and the other a second fold at right angles to the first fold, a cross feed mechanism adapted to pass the sheet from the first folder to the second folder, and embodying a downwardly feeding series of rolls and a transversely moving belt at the bottom of said rolls, a frame within which said rolls and belt are mounted, the said frame being pivotally mounted at its lower end whereby it may be swung out of and into operative relation to the first folder, a framework within which the folder and said belt mechanism are supported, said framework embodying a spreader against which the said pivoted frame is adapted to rest with the feed mechanism in an inoperative position, and a strut adapted to extend between said frame and said spreader to hold the frame in operative relation with respect to the first folder.

14. In a folding machine, the combination of a folder adapted to produce the initial fold in a sheet, a parallel folder adapted to produce a second fold in a sheet parallel to the first fold and embodying pivoted arms adapted to swing freely downward, a spring latch secured to one of said arms, a framework within which the folders are mounted, a keeper on said framework and around which the said latch is adapted to be sprung, whereby to hold the parallel folder in operative relation to the first named folder, means for actuating said folders, and means for varying the tension upon said spring latch.

15. In a paper folding machine, the combination of rolls and buckling plates with which the said rolls coact to produce the initial fold in a sheet, one of said rolls being adapted to coact with the other two rolls, respectively, in feeding the paper into the buckling plates and delivering the paper from the buckling plates to form the fold, a parallel folder embodying two rolls one of which is adapted to coact with one of the first named rolls that acts as a delivery roll, said parallel folder also embodying plates adapted to coact with the rolls of the first named folder and the parallel folder to produce parallel folds in the sheet, and means for driving the said rolls.

16. In a paper folding machine, the combination of rolls and buckling plates with which the said rolls coact to produce the initial fold in a sheet, one of said rolls being adapted to coact with the other two rolls, respectively, in feeding the paper into the buckling plates and delivering the paper from the buckling plates to form the fold, a parallel folder embodying two rolls, one of which is adapted to coact with one of the first named rolls that acts as a delivery roll, said parallel folder also embodying oppositely facing buckling plates adapted to coact with the rolls of the first named folder and the parallel folder to produce parallel folds in the sheet, and means for driving the said rolls, one of said buckling plates being removable, as and for the purpose set forth.

17. In a paper folding machine, the combination of two feed rolls $A^1$ and $B^1$, set one above the other, a crimping roll $C^1$ set on substantially the same plane as the roll $A^1$, a buckling mechanism coacting with said three rolls, a fourth roll 107 adapted to engage the roll $C^1$, a fifth roll 106 adapted to engage said roll 107, buckling plates interposed between the said rolls, and means for driving said rolls, as and for the purpose set forth.

18. In a paper folding machine, the combination of a plurality of folders, one above the other, means for actuating said folders, said folders being adapted to form successive folds in a sheet, one fold at right angles to the preceding, a down feed mechanism embodying a series of rolls in vertical alinement and angling downward and towards the receiving ends thereof, said mechanism being adapted to receive the sheet from one folder and pass it downwardly to the next, and means for actuating said down feed mechanism.

19. In a paper folding machine, the combination of a plurality of folders adapted to form successive folds in a sheet, one fold at right angles to the preceding fold, a down feed mechanism consisting of rolls arranged in pairs and set in vertical alinement with rounded receiving ends adapted to act as guides for admitting a sheet of paper between the rollers of the respective pairs, and means for actuating the said down feed mechanism.

20. In a paper folding machine, a plurality of folders adapted to produce successive folds in a sheet, one fold at right angles to the preceding, means for actuating the said folders, a down feed mechanism consisting of inclined rolls arranged in pairs, said rolls being supported at their upper ends only, the other ends free from support, and said rolls adapted to receive the sheet from one folder and pass it to the next, and means for actuating said rolls.

21. In a paper folding machine, the combination of a plurality of folders adapted to form successive folds in a sheet, one fold at right angles to the preceding fold, a series of inclined rolls adapted to draw the paper inwardly between them from one folder and pass it downwardly to the other, and adjustable means for limiting the inwardly drawing action of said rolls.

22. In a paper folding machine, the combination of a plurality of folders adapted to form successive folds in a sheet, one fold at right angles to the preceding fold, a series of inclined rolls adapted to draw the paper inwardly between them from one folder and pass it downwardly to the other, a stop guide provided with fingers adapted to extend between said rolls and arranged to contact with the paper as it is drawn inwardly between said rolls, so as to limit such movement of the paper, and means for adjusting said guide along the rolls.

23. In a paper folding machine, the combination of a plurality of folders, adapted to form successive folds in a sheet, one fold at right angles to the preceding, means for operating said folders, a down feed mechanism adapted to pass the sheet from one of these folders to the other, a stop guide coacting with said down feed mechanism for the purpose specified, means for actuating said down feed mechanism, a guide plate interposed between said down feed mechanism and the second of these folders herein mentioned and provided with a contracted slot through which the paper is adapted to pass, the stop guide being formed with a beveled lug 82 adapted to extend into said slot.

24. In a folding machine, the combination of a plurality of folders adapted to produce successive folds in a sheet, one fold at right angles to the preceding, a down feed mechanism adapted to pass the sheet from one folder to the other, and consisting of inclined rolls arranged in pairs, the rolls of each pair being spaced slightly from each other to such an extent that a folded sheet may be easily shoved between them edgewise and end-wise to the rolls and so that its own expansion will provide the necessary friction to hold the paper supported therein, and means for actuating said rolls.

25. In a folding machine, the combination of a plurality of folders adapted to produce successive folds in a sheet, one fold at right angles to the preceding, and a series of inclined rolls adapted to pass the sheet from one of these folders to the other, the said rolls being supported at one end only and operatively connected together for simultaneous rotation, and an operative driving connection between the said rolls and the folder that is designed to make the second fold herein mentioned.

26. In a paper folding machine, the combination of a vertically disposed folder embodying a pair of delivery rolls, another folder adapted to fold a sheet at right angles to the first folder mentioned herein, means for operating said folders, a down feed mechanism adapted to pass the sheet from the first of these folders to the other and embodying a series of rolls with rounded ends in close proximity to the delivery rolls of the first mentioned folder, whereby the folder will guide the edge of the sheet last released therefrom into the down feed rolls, and means for operating said last named rolls.

27. In a paper folding machine, a first folder embodying a series of rolls and primary and secondary buckling plates coacting therewith, the primary plate being provided with a rounded heel portion 12 and a longitudinally ribbed paper contacting surface on opposite sides of said heel portion, the said ribs merging into the heel, as and for the purpose set forth.

28. In a paper folding machine, folding rolls and primary and secondary buckling plates coacting therewith, the said secondary plate consisting of finely corrugated metal, substantially as described.

29. In a paper folding machine, a series of rolls and buckling plates coacting therewith, a supporting rod connected to one of said plates, a carriage adjustably mounted upon said rod and provided with oppositely extending arms, a stop device carried by said arms, and means for adjusting the said stop device with relation to one arm irrespective of the other.

30. In a paper folding machine, a series of rolls and buckling plates coacting therewith, a stop device for the paper, a carriage provided with oppositely extending arms, said arms being formed with slots, adjusting nuts in said slots, hook bolts extending across said slots and through said nuts and secured to said stop device, and a rod upon which said carriage is adjustably mounted.

31. In a paper folding machine, a series of rolls, and buckling plates coacting therewith, a stop device for the paper coöperating with said rolls, and laterally adjustable curved guides 24 secured to said stop device.

32. In a paper folding machine, the combination with the rolls, the buckling plates and the stop device of said plates, of a hook attachment adapted to be adjustably secured to said stop device and provided with a beveled edge 29, as and for the purpose set forth.

33. In a paper folding machine, a folding mechanism adapted to make a second fold after a first fold has been made, said mechanism embodying a buckling plate with a serrated paper contacting surface, the serrations being small and with their surfaces all in the same plane.

In testimony whereof I affix my signature in presence of two witnesses.

OLIVER W. JOHNSON. [L. S.]

Witnesses:
R. D. DAY,
WM. WISNER WHITE.